R. B. DISBROW.
BUTTER SPADE.
APPLICATION FILED DEC. 23, 1909.
969,528.
Patented Sept. 6, 1910.
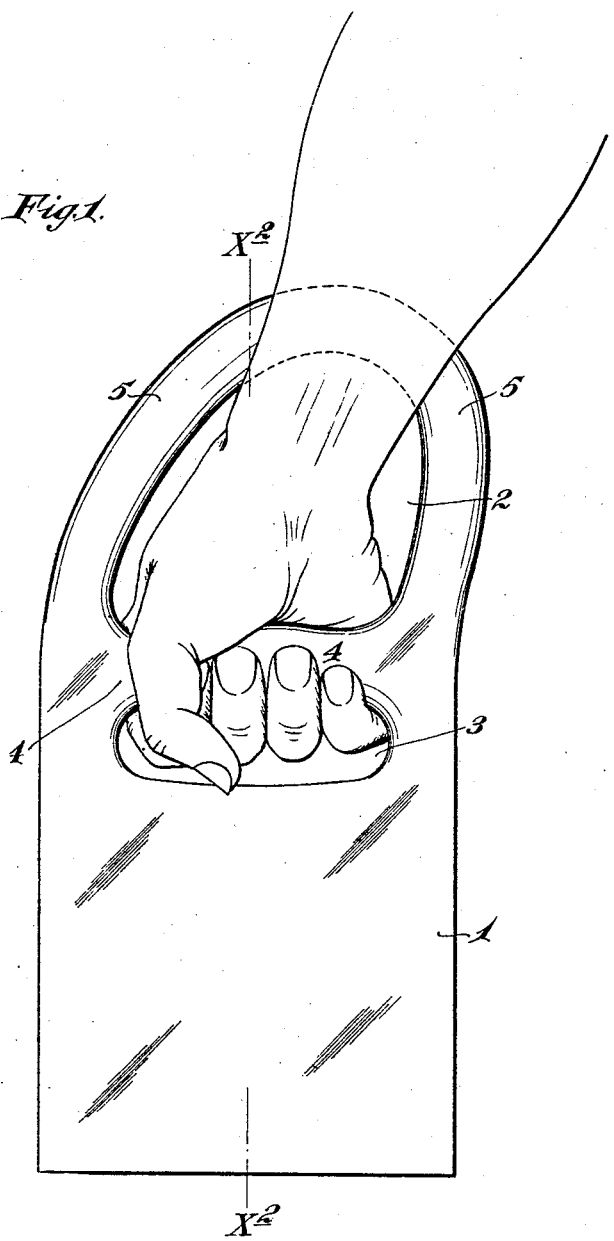
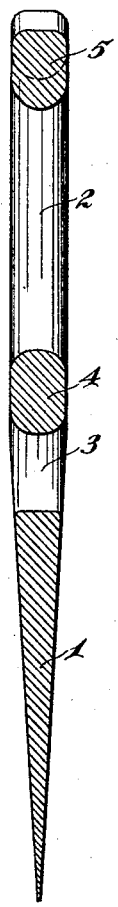
Witnesses:
W. H. Souba.
A. H. Opsahl.
Inventor:
Reuben B. Disbrow.
By his Attorneys,
Williamson Merchant

UNITED STATES PATENT OFFICE.

REUBEN B. DISBROW, OF OWATONNA, MINNESOTA.

BUTTER-SPADE.

969,528.  Specification of Letters Patent.  Patented Sept. 6, 1910.

Application filed December 23, 1909. Serial No. 534,618.

*To all whom it may concern:*

Be it known that I, REUBEN B. DISBROW, a citizen of the United States, residing at Owatonna, in the county of Steele and State of Minnesota, have invented certain new and useful Improvements in Butter-Spades; and I do hereby declare the following to be a full, clear, and exact description of the invention, such as will enable others skilled in the art to which it appertains to make and use the same.

My invention has for its object to provide an improved butter spade adapted for general use in handling butter, but especially adapted for use for the purpose of removing butter from combined churns and butter workers.

To the above ends, the invention consists of the novel construction and arrangement of parts hereinafter described and defined in the claims.

In the accompanying drawings, which illustrate the invention, like characters indicate like parts throughout the several views.

Referring to the drawings, Figure 1 is a plan view, showing the improved spade held in the hand of an operator; and Fig. 2 is a section taken on the line $x^2$ $x^2$ of Fig. 1.

The entire spade, preferably, is made from a single piece of hardwood and its blade 1 is tapered to quite a sharp edge, while the other or handle end of the spade is cut to form a hand hole 2, a finger passage 3, a gripping bar 4 between the said hand hole 2 and finger passage 3, and a bail-like arm engaging portion 5 immediately surrounding the said hand hole 2.

The manner of holding the improved spade is shown in Fig. 1, by reference to which it will be seen that the gripping bar 4 is gripped by the hand which is passed through or into the hand hole 2 and that the bail-like portion 5 then rests against the arm, so that it affords good leverage in which to cut and lift the butter. When the spade is held in the hand and the hand is reached into a churn, the wrist will naturally be bent sidewise, and it is important to here note that the bail 5 is bent or offset slightly in the plane of the said spade, so as to make the bail better fit the hand and arm when thus used. It is also important to note that the blade of the spade is beveled equally on both sides, or, in other words, that the entire spade is bi-symmetrical in respect to a plane centrally intersecting the same flatwise, so that the spade may be used equally well either in the right or the left hand. Butter spades of this character are adapted to be used either singly, that is, in one hand only, or they may be used one in each hand, for certain kinds of work.

The improved spade, while extremely simple, has, in actual practice, been found highly efficient for the purposes had in view.

What I claim is:

1. A spade having a blade, a hand hole, a finger passage, a gripping bar between said hand hole and finger passage, and an arm engaging bail embracing said hand hole, substantially as described.

2. A spade comprising a blade, a hand hole, a finger passage, a gripping bar between said hand hole and finger passage, and an arm engaging bail embracing said hand hole, the said bail being offset or bent in the plane of the spade, substantially as described.

3. A spade having a blade, a hand hole, a finger passage, a gripping bar between said hand hole and finger passage, and an arm engaging bail embracing said hand hole, the said blade being beveled equally on both faces whereby the latter is made bi-symmetrical and adapted for use either in the right or the left hand, substantially as described.

In testimony whereof I affix my signature in presence of two witnesses.

REUBEN B. DISBROW.

Witnesses:
 ALICE V. SWANSON,
 HARRY D. KILGORE.